United States Patent [19]
Johnson

[11] 3,982,292
[45] Sept. 28, 1976

[54] BOAT TRAILER
[75] Inventor: Leo D. Johnson, Powell River, Canada
[73] Assignee: The Raymond Lee Organization, Inc., New York, N.Y. ; a part interest
[22] Filed: June 9, 1975
[21] Appl. No.: 584,974

[52] U.S. Cl. .................................... 9/1.2; 115/1 A; 280/414 A; 115/1 A
[51] Int. Cl.² ........................................ B60C 13/00
[58] Field of Search ..................... 9/1 T; 280/414 A

[56] References Cited
UNITED STATES PATENTS

| | | |
|---|---|---|
| 2,515,564 | 7/1950 | Mercer et al ............................ 9/1 T |
| 2,603,505 | 7/1952 | Arrowood ............................... 9/1 T |
| 2,673,991 | 4/1954 | Dahlkuist ........................ 280/414 A |
| 3,135,560 | 6/1964 | Carlson .................................. 9/1 T |
| 3,195,919 | 7/1965 | Lossman ..................... 280/414 A X |

Primary Examiner—George E. A. Halvosa
Assistant Examiner—Gregory W. O'Connor
Attorney, Agent, or Firm—Howard I. Podell

[57] ABSTRACT

A boat which becomes a wheeled trailer by use of attachable wheels and an attachable tow rod. The boat is fitted with female fittings which engage mating male members fitted on the attachable tow rod and attachable wheel assemblies, with one such female fitting mounted on the bow to engage the tow rod and two such female fittings mounted on each side panel of the boat to engage a wheel assembly.

4 Claims, 6 Drawing Figures

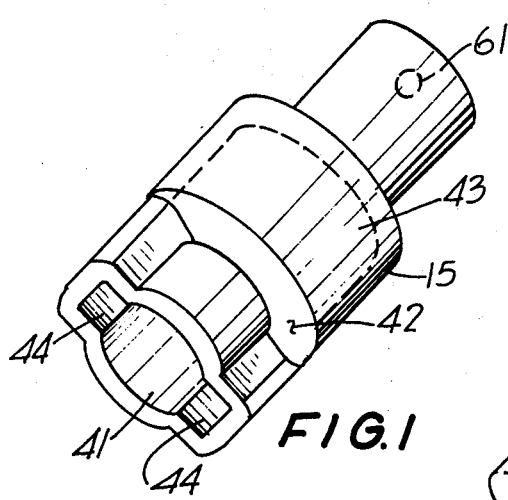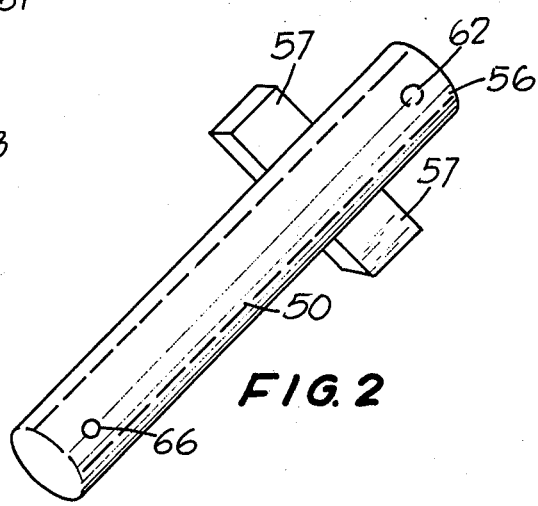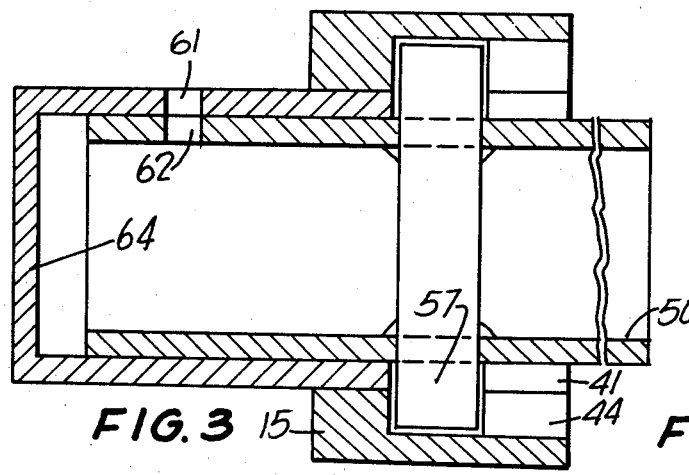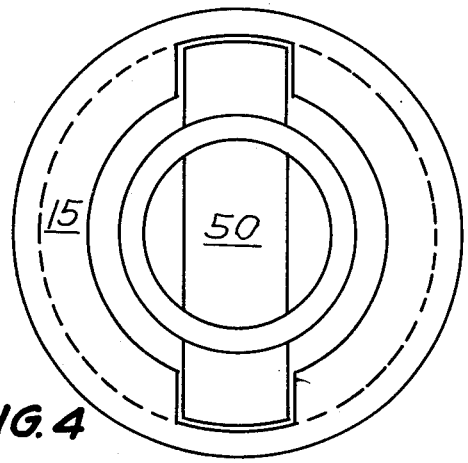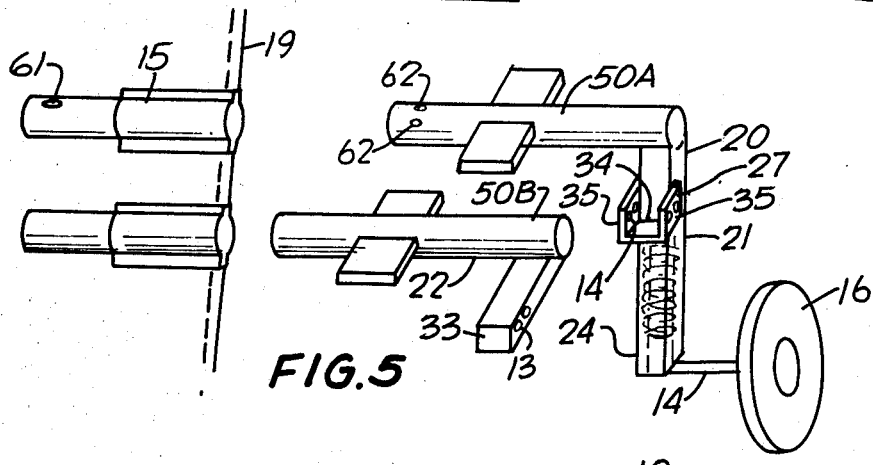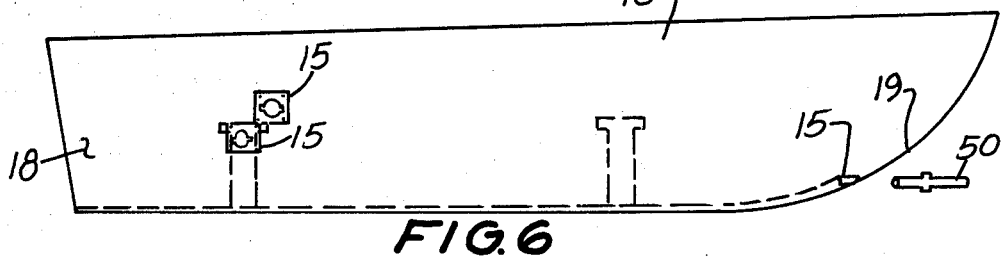

BOAT TRAILER

SUMMARY OF THE INVENTION

My invention is a boat which becomes a wheeled trailer by use of attachable wheels and an attachable tow rod. The boat is fitted with female fittings which engage mating male members fitted on the attachable tow rod and attachable wheel assemblies, with one such female fitting mounted on the bow to engage the tow rod and two such female fittings mounted on each side panel of the boat to engage a wheel assembly.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the female fitting;

FIG. 2 is a perspective view of the male fitting;

FIG. 3 is a sectional view of the assembly of a male and female fitting;

FIG. 4 is an end view of the assembly of a male and female fitting;

FIG. 5 is a side view of the equipped boat; and

FIG. 6 is an exploded perspective view of an attachable wheel and fittings.

DESCRIPTION OF THE PREFERRED EMBODIMENT

Turning now descriptively to the drawings, in which similar reference characters denote similar elements throughout the several views, FIGS. 1 and 3 illustrate the female fitting 15, one of which is mounted on the bow 19 of the boat 10 and two of which are mounted on each boat rear side panel 18 as shown in FIG. 5. The female fitting 15 is formed of a hollow metal shell with a non-circular opening 41 on front face 42 of the fitting leading to the cylindrical shaped recessed interior 43. Opening 41 is formed with two transverse wing recesses 44. Recess 43 is completely enclosed by cap 64 at the rear of fitting 15.

Male member 50 is formed as a hollow cylindrical rod fitted at free end 56 with two transverse projections 57 so that the profile of the projections and bar 50 is of a size to slip readily into opening 41 of a female fitting 15, with ninety degree rotation of the towing bar 50 latching projections 57 into wing recesses 44 of the female fitting 15, as shown in FIGS. 3-4.

One or more holes 61 in female fitting 15 and one or more holes 62 in end 56 of male member 50 may be located so that a pin may be latched in the aligned holes 61 and 62 in the assembled condition. However such holes 61 are not formed in the female fitting 15 employed at the bow 19 of the boat 10 since the bow fitting 15 may be mounted under the water level line of the boat 15, and the male member 50 when employed as a tow bar is fixed in non-rotatable engagement with the towing vehicle (not shown) by means of a pin in hole 66 in male member 50.

As shown in FIG. 5 one female fitting 15 is mounted to the bow 19 of the boat for attachment to a male member 50 in the form of a towing rod and a pair of female fittings 15 are mounted on each rear side panel 18 of the boat for attachment to a wheel assembly 20.

Each wheel assembly 20 is formed of two members, a wheel brace 21 and a latch brace 22.

Wheel brace 21 is formed with a wheel 16 rotatably fastened by an axle mounting 14 to a hollow vertical strut 24, with a compression spring in strut 24 bearing internally against axle mounting 14 to provide loading for road impact. Vertical strut 24 is fitted at its upper end to a male member 50A oriented horizontally in the assembled condition, which latches into one female fitting 15. A second male member 50B is fitted with a bracket member 33 oriented radially to the male member to serve as a latch brace 22, so that rotation of latch brace 22 about the axis of its male member 50B will locate bracket member 33 in the recess 34 enclosed by the three sides 35 of a bracket 27 fastened to a side of the vertical strut 24 of a wheel brace 21.

Holes 14 in bracket 27 align in the assembled position with holes 13 of bracket 33 so that the assembly may be pinned together in the latched position, with a pin also engaging hole 62 of wheel brace 21 and hole 61 engaged female fitting 15 located above the waterline of boat panel 19.

The boat 10 when attached to a tow bar 50 and two wheel assemblies 20 serves as a trailer to be towed by a vehicle, with the tow bar male member 50 and each wheel assembly 30 readily detachable when the boat is put in the water.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A wheel attachment assembly adaptable for detachably fastening of a wheel to a boat comprising
   a pair of female sockets mounted laterally, a spaced distance apart, to one side of a boat,
   a pair of male plugs, each shaped to matingly engage an individual said female socket,
   a wheel and axle unit fixed to a support member fixed to a first said male plug, said support member fitted with a first bracket, with
   the second said male plug fixed to a second bracket, said first and second brackets fitted with detachable means to engage and attach to each other.

2. The combination as recited in claim 1 in which the axis of the axle of the wheel and axle unit is fixed in generally perpendicular orientation to the axis of the support member so that, in the position of use, the support member furnishes direct vertical support to the axle, with
   the first and second brackets in the engaged position furnishing lateral support to the said support member and attached axle and also serving to prevent rotation of either plug in the engaged socket.

3. The combination as recited in claim 2 in which the female sockets are mounted above the normal waterline of the boat, with the support member of a length to extend from an attached female socket to a distance below the waterline of the boat and below said female socket so that the wheel, attached to the side of the support member may ride on a surface below the bottom of the boat.

4. The combination as recited in claim 1 in which each socket is formed with a cylindrical recess, the external opening of which is partially blocked by a shaped face to form a non-circular opening, and
   each plug is formed with a cylindrical surface fitted with detents to fit the non-circular opening of the face of a socket.

* * * * *